Patented May 5, 1925.

1,536,920

UNITED STATES PATENT OFFICE.

JOSEPH CARL PARKINSON, OF TARENTUM, PENNSYLVANIA, ASSIGNOR TO PITTSBURGH PLATE GLASS COMPANY, A CORPORATION OF PENNSYLVANIA.

GLASS AND BATCH THEREFOR.

No Drawing. Application filed November 15, 1922. Serial No. 601,145.

*To all whom it may concern:*

Be it known that I, JOSEPH CARL PARKINSON, a citizen of the United States, and a resident of Tarentum, in the county of Allegheny and State of Pennsylvania, have made a new and useful invention in Improvements in Glass and Batches Therefor, of which the following is a specification.

The invention relates to absorptive glass, and has for its principal object the provision of an improved glass particularly adapted for use in spectacles which completely cuts off the passage of the ultra violet rays and a portion of the violet rays and which is at the same time highly transparent and has a pleasing yellow tint. The batch preferably used in producing the glass is as follows:

| | Parts by weight. |
|---|---|
| Sand | 930 |
| Soda ash | 250 |
| Whiting | 310 |
| Potash | 122 |
| Borax glass | 100 |
| Cadmium sulfide | 13 |
| Sulphur | 4 |

The glass can be produced without the sulphur being present, but better results are obtained when sulphur is present to supply any sulphur which may be lost by the decomposition of the cadmium sulfide. This sulphur may also be added as another metallic sulfide, such as zinc sulfide. The yellow tint will vary in accordance with the amount of the coloring sulfide present, the amount in the batch given above figuring about three quarters of one per cent of the weight of the total batch.

What I claim is:

1. A glass for absorbing ultra-violet rays containing cadmium, such glass having a yellow tint, and being substantially free from coloring matter other than the cadmium.

2. A glass for absorbing ultra-violet rays containing cadmium sulfide, such glass having a yellow tint, and being substantially free from coloring matter other than the cadmium sulfide.

3. A batch for producing a glass adapted to absorb ultra-violet rays and including cadmium sulfide, and being substantially free from any other coloring ingredient.

4. A batch for producing a glass adapted to absorb ultra-violet rays and including cadmium sulfide and sulphur, and being substantially free from any other coloring ingredient.

5. A batch for producing a glass adapted to absorb ultra-violet rays and including approximately three quarters of one per cent by weight of cadmium sulfide, and being substantially free from any other coloring ingredient.

In testimony whereof, I have hereunto subscribed my name this 31st day of October, 1922.

J. CARL PARKINSON.